United States Patent
O'Brien

(10) Patent No.: US 9,248,939 B2
(45) Date of Patent: Feb. 2, 2016

(54) FURLED BOTTLE SLEEVE

(71) Applicant: Darren O'Brien, Sparks, MD (US)

(72) Inventor: Darren O'Brien, Sparks, MD (US)

(*) Notice: Subject to any disclaimer, the term of this patent is extended or adjusted under 35 U.S.C. 154(b) by 0 days.

(21) Appl. No.: 13/760,723

(22) Filed: Feb. 6, 2013

(65) Prior Publication Data

US 2014/0048509 A1  Feb. 20, 2014

Related U.S. Application Data

(60) Provisional application No. 61/595,360, filed on Feb. 6, 2012.

(51) Int. Cl.
| | |
|---|---|
| *B65D 25/34* | (2006.01) |
| *B65D 23/08* | (2006.01) |
| *B29D 22/00* | (2006.01) |
| *B65D 81/38* | (2006.01) |
| *B29C 49/24* | (2006.01) |

(52) U.S. Cl.
CPC .......... *B65D 23/0857* (2013.01); *B29D 22/003* (2013.01); *B65D 81/3886* (2013.01); *B29C 2049/2422* (2013.01)

(58) Field of Classification Search
CPC ........ B65D 7/42; B65D 17/165; B65D 81/18; B65S 23/14
USPC ................................... 220/737–739; 215/386
See application file for complete search history.

(56) References Cited

U.S. PATENT DOCUMENTS

| | | | |
|---|---|---|---|
| 4,138,026 A * | 2/1979 | Conklin | 215/12.2 |
| 5,222,656 A | 6/1993 | Carlson et al. | |
| D434,655 S * | 12/2000 | Haugh et al. | D9/434 |
| 6,718,733 B2 * | 4/2004 | Kilmartin | 53/397 |
| 7,858,015 B2 * | 12/2010 | Urquhart et al. | 264/301 |
| D645,700 S * | 9/2011 | Hadley | D7/396.2 |
| 8,087,147 B2 * | 1/2012 | Hollis et al. | 29/469 |
| 8,561,834 B2 * | 10/2013 | Ziegler | 220/740 |
| 8,579,133 B2 * | 11/2013 | Marcus et al. | 215/11.6 |
| 2008/0078824 A1 * | 4/2008 | Spriegel et al. | 229/403 |

* cited by examiner

*Primary Examiner* — Anthony Stashick
*Assistant Examiner* — Raven Collins
(74) *Attorney, Agent, or Firm* — Ober, Kaler, Grimes & Shriver; Royal W. Craig

(57) ABSTRACT

A semi-rigid sleeve for a bottle that is open at both ends and can be inserted downward onto a freestanding bottle so as to cling thereto as a second skin. The sleeve generally comprises a cylindrical body defined by a resilient sheet of semi-rigid material (preferably high-density plastic) open at both ends and having an axial slit running end-to-end, the body being defined by an inward axial curvature and compression-formed with a shape-memory characteristic to normally retain a smaller (furled) first diameter which can be forcibly expanded by parting along said slit to a larger (unfurled) second diameter. An optional rubber coating may be applied to the interior/exterior of the body for insulation purposes. The smooth semi-rigid exterior surface of the bottle sleeve provides a superior advertising medium and outstanding multi-color graphics can be applied by thermoset printing processes, resulting in far more eyecatching graphics than traditional foam koozies.

10 Claims, 4 Drawing Sheets

FURLED BOTTLE SLEEVE

CROSS-REFERENCE TO RELATED APPLICATION(S)

The present application derives priority from U.S. provisional application 61/595,360 filed Feb. 6, 2012.

BACKGROUND OF THE INVENTION

1. Field of the Invention The present invention relates to sleeves for beverage containers and, more particularly, to a furled shape-memory sleeve capable of single-handed downward insertion over a freestanding bottle-shaped container for ornamental and/or insulation purposes.

2. Description of the Background

There are many different "koozies", sleeves or jackets for beverage containers. Most typical sleeves serve to keep a consumer's hand warm while keeping their drink cold. However, the marketing value of container sleeves is far more significant than their functional purpose. At a relatively low cost such sleeves can be emblazoned with logos and given away as promotional items in the hope to boost brand recognition. Most all conventional sleeves comprise round foam cylinders with a foam base (generally a hole is provided in the base to alleviate creation of a vacuum). Such sleeves are made from polymer materials like neoprene, polyester or open cell foam. In all known cases the sleeves are open-topped, allowing insertion of the beverage container bottom-first into the sleeve. See, for example, U.S. Pat. No. 5,222,656 which discloses a standard frusto-conical sleeve that lacks the capability to collapse for storage or to fit around various sizes of beverage containers.

Every year, the U.S. consumes around 50 billion disposable bottles, and bottlers are moving toward producing bottles made of polyethylene terephthalate (PET), high-density polyethylene (HDPE), low-density polyethylene (LDPE), copolyester, or polypropylene. This is because they are inexpensive, transparent, and shatter resistant, resealable, recyclable and durable. Many manufacturers are producing multi-use "water" bottles of like materials with an array of resealable nozzle and/or mouths. Most are blow-molded. Plastic granules are melted, and injection-molded into a bottle "preform" which is withdrawn from the injection cavity while still hot. The preform is then stretched (by insufflation) to form the bottle. Whether multiuse or disposable, plastic bottles typically have a sloping shoulder, rounded ridge(s), central label panel, and rounded base. Labeling of plastic bottles is done with adhesive labels which may be attached by a variety of cold glues, hot melts, pressure sensitive glues, and heat seal labels. Alternatively, plastic bottles can be labeled by screen printing. In all cases the labeling is permanent. Thus customization and personalization of plastic bottle products by consumers is not possible. Consumers love creating personalized custom products. Consequently, there would be significant demand for an aftermarket sleeve for a plastic bottle which provides that ability.

SUMMARY OF THE INVENTION

It is an object of the present invention to provide a furled resilient bottle sleeve that can be inserted onto a freestanding plastic beverage container and which is securely anchored thereto by its own inherent resiliency and the surface features of the plastic bottle.

It is another object to provide a furled resilient bottle sleeve with a shape-memory characteristic that can be inserted onto a freestanding plastic beverage container with a simple top-down collaring maneuver.

It is another object to provide a furled resilient bottle sleeve with customized label or screen printing for consumer personalization.

In accordance with the foregoing objects, the present invention is a furled-resilient self-clamping bottle sleeve formed of high-density plastic into a furled and overlapping resilient sheet. The furled sheet has a shape-memory characteristic which normally retains a first diameter smaller than that of the bottle to which it is applied, but can be forcibly expanded to a second diameter exactly conforming to the exterior of said bottle. The furled bottle sleeve is open at both ends and, in use, can be inserted onto a freestanding bottle with a top-down fist-pounding action. The neck of the bottle enters the open lower end of the sleeve and unfurls it, progressively expanding it from bottom-to-top to its larger second diameter which exactly conforms to the exterior of said bottle. The shape memory characteristic causes the sleeve to cling to the bottle as a second skin. Moreover, the smooth exterior surface of the bottle sleeve provides a superior advertising medium and outstanding multi-color graphics can be applied by dry screen printing processes, resulting in far more eye catching graphics than traditional foam koozies. The device is well-suited for any disposable bottle or multi-use water bottle having suitable surface features such as at least one ridge along its body.

BRIEF DESCRIPTION OF THE DRAWINGS

Other objects, features, and advantages of the present invention will become more apparent from the following detailed description of the preferred embodiment and certain modifications thereof when taken together with the accompanying drawings in which.

DETAILED DESCRIPTION OF THE PREFERRED EMBODIMENTS

The present invention is a furled rigid sleeve having a shape-memory characteristic that can be inserted onto a freestanding plastic bottle with a fist-pounding action, and which remains securely anchored thereto vis-à-vis the surface features of the plastic bottle combined with the shape memory of the sleeve.

Figure 1:
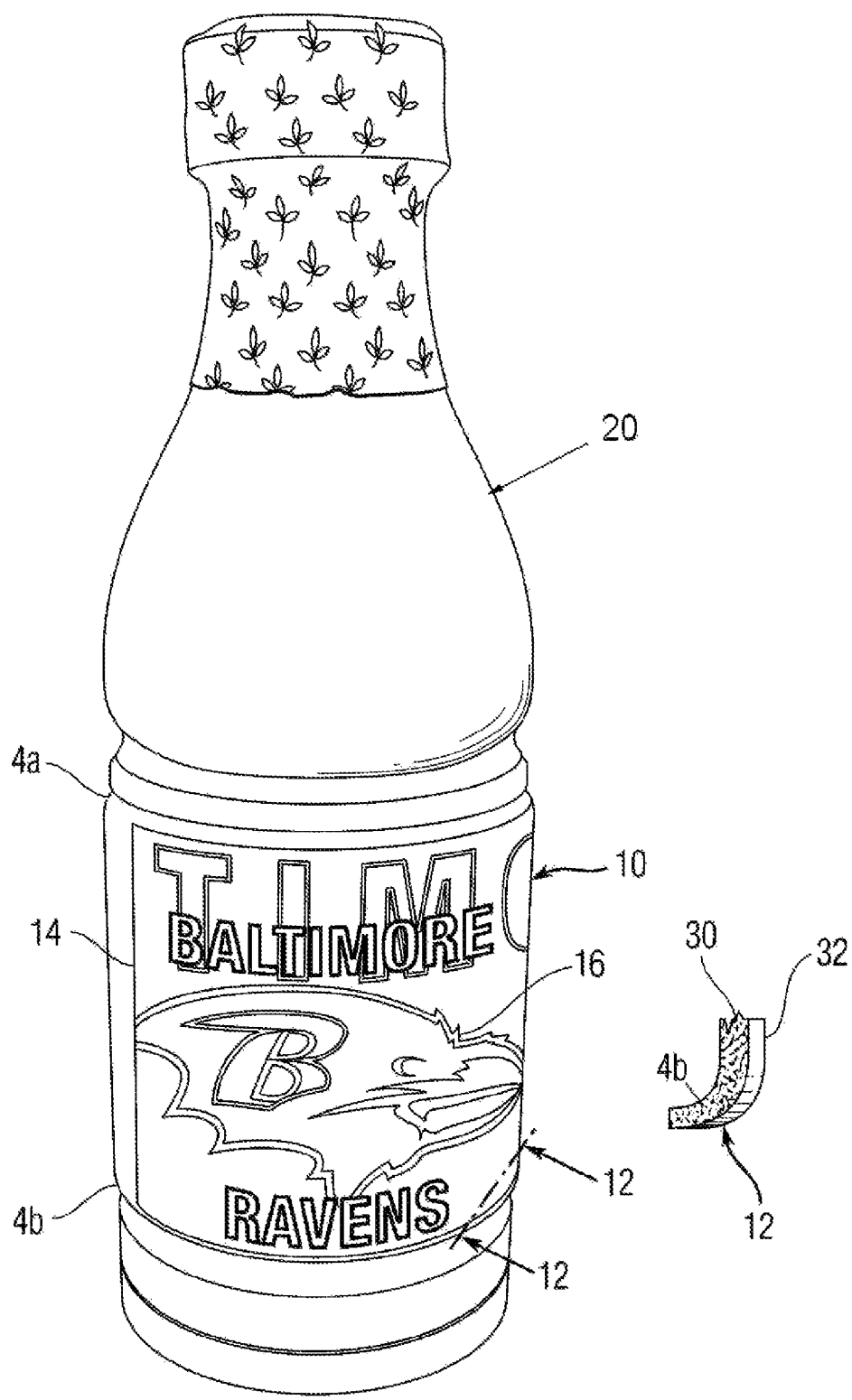
FIG. 1 is a perspective end view of the furled plastic bottle sleeve according to the present invention worn on a disposable bottle.

FIG. 1 is a perspective front view of the furled plastic bottle sleeve 10 according to an embodiment of the present invention. The sleeve 10 is specifically designed for use with a plastic bottle having particular surface features typically defined by an in-molded label panel. The necessary surface feature(s) comprise at least one rounded ridge along the main body of the bottle, and more preferably two spaced rounded ridges 4a, 4b as shown in FIG. 1.

Sleeve 10 generally comprises a substantially cylindrical body formed from a resilient plastic sheet material and cut or formed lengthwise from top to bottom (or end to end) as shown, to define two distinct sides. The sleeve 10 is open at both ends and is formed with an inwardly-curved lip 12 at one or both ends as shown in the inset, the inward lip 12 conforming to the rounded ridge(s) 4a, 4b of the bottle. The inwardly-curved lip(s) 12 enter the rounded ridge(s) 4a, 4b of the bottle and releasably anchor themselves therein. For example, in the illustrated embodiment both ends are defined by an inwardly-curved lip 12 for a stronger grip across the bottle's label panel, anchored in both ridges 4a, 4b.

The sleeve 10 is blow-molded as described above in a cylindrical form and is then cut or formed with a lengthwise slit from top to bottom lip 12. During conventional blow-molding, the cylindrical form of sleeve 10 is formed from a smaller diameter "preform" as is customarily utilized in the blow molding of plastic containers. The outward radial expansion of the preform during blow molding results in an intermediate cylinder that is radially inwardly internally stressed. The plastic material is molecularly oriented with a desire to contract circumferentially inward to its previous state. When the sleeve 10 is cut or formed with a lengthwise slit from top to bottom lip 12, the internal stresses are relieved and the sleeve 10 actually contracts circumferentially inwards. This characteristic is known as shape memory.

The inherent shape-memory characteristic of the high-density plastic results in a furling of the sleeve 10 such that it normally retains a first diameter $d_1$ slightly smaller than that of the bottle to which it is applied. However, the sleeve 10 can be forcibly expanded to a second diameter $d_2$ exactly conforming to the exterior of said bottle. The shape memory characteristic causes the sleeve 10 to cling to the bottle as a second skin about the label panel, and the inwardly-curved lips 12 help to retain it on the label panel of the bottle.

Sleeve 10 is preferably made of rigid yet resilient high-density plastic including any one chosen from among the group consisting of high-density polyethylene terephthalate (PET), high density polyethylene (HDPE), polyvinyl chloride (PVC), or polypropylene (PP). The sleeve 10 may be formed by conventional blow molding techniques followed by machining.

The sleeve 10 adds nominal insulation qualities to the bottle, but additional insulation can be added by spraying the plastic sleeve 10 interiorly with a rubber coating spray, resulting in a solid shape-memory layer 30 (shown in inset) with limited resilience and a softer rubber layer 32 for internal insulation. A suitable exemplary exterior spray is EZ-Spray® Silicone 20 which is a sprayable silicone rubber. The spray-exterior 32 is applied until a suitable spray thickness accrues (2-3 mm) and cures quickly in about 10 minutes with negligible shrinkage to a strong, durable coating. One skilled in the art should understand that the rubber coating 32 may alternatively be applied by a hot-dip or other production process, if desired. The thermally-conductive layer 30 sandwiched between the bottle/can and insulating rubber layer 32 traps cold and keeps bottles colder longer than competing products such as closed cell foam koozies. Specifically, when applied to a wine bottle the insulating sleeve 10 will keep the wine cool at its proper temperature (between 45-55 degrees Fahrenheit) for at least thirty minutes. Also the rubber layer 32 increases friction against the bottle held therein and, in combination with the furled lips 14, improves the consumer's grip on the bottle.

Figure 2:
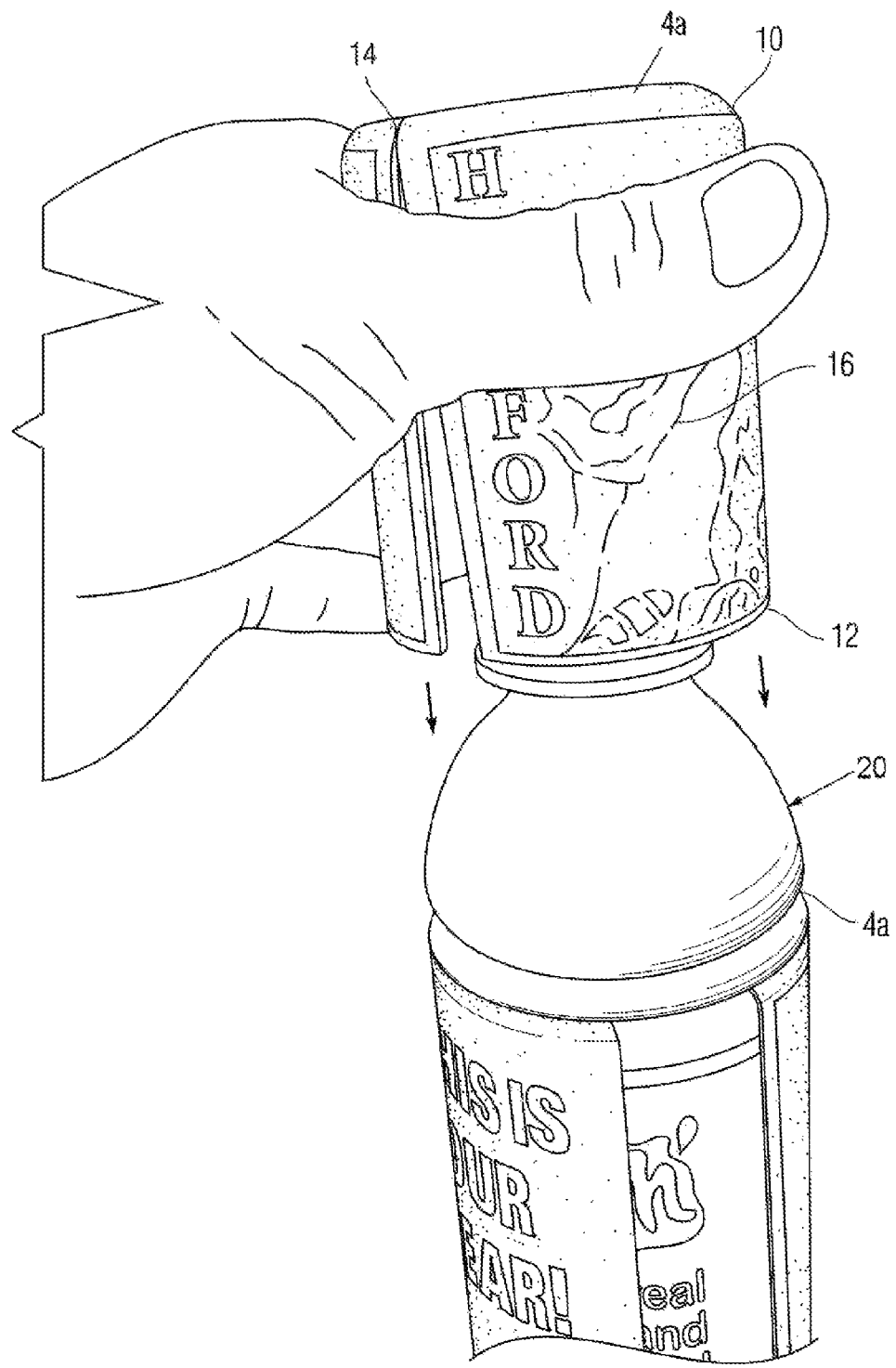
FIG. 2 is a perspective view showing the insertion method of the furled plastic bottle sleeve according to the present invention.

FIG. 2 is a perspective view showing the insertion method of the furled bottle sleeve 10 according to the present invention. Because the furled bottle sleeve 10 remains open at both ends it can be inserted onto a freestanding beverage container 20 with a top-down fist-pounding action. The neck of the bottle 20 enters the open lower end of the sleeve 10 and unfurls it, progressively expanding it from bottom-to-top and achieving the larger second diameter which exactly conforms to the exterior of the bottle 20. The shape memory characteristic in conjunction with the inwardly-curved lips 12 causes the sleeve 10 to cling to the bottle 20 as if it were a second skin.

The smooth exterior surface of the bottle sleeve 10 may be imprinted by dry screen printing processes, or rolled against a rubber print cylinder to print up to four colors of thermoset ink simultaneously, then overvarnished and cured. This results in far more eyecatching brand-advertising graphic 16 than would otherwise be possible on competing open-cell foam materials.

The bottle sleeve 10 may be dimensioned such that it covers most bottles, cans and other containers including candle sleeves, soap dispensers, etc. All that is required is a bottle having particular surface features comprising at least one rounded ridge along the main body of the bottle, and more preferably two spaced rounded ridges 4a, 4b as shown in FIG. 1. However, multi-use water bottles can also be provided with a ridge 4 as shown in FIG. 3.

Figure 3:
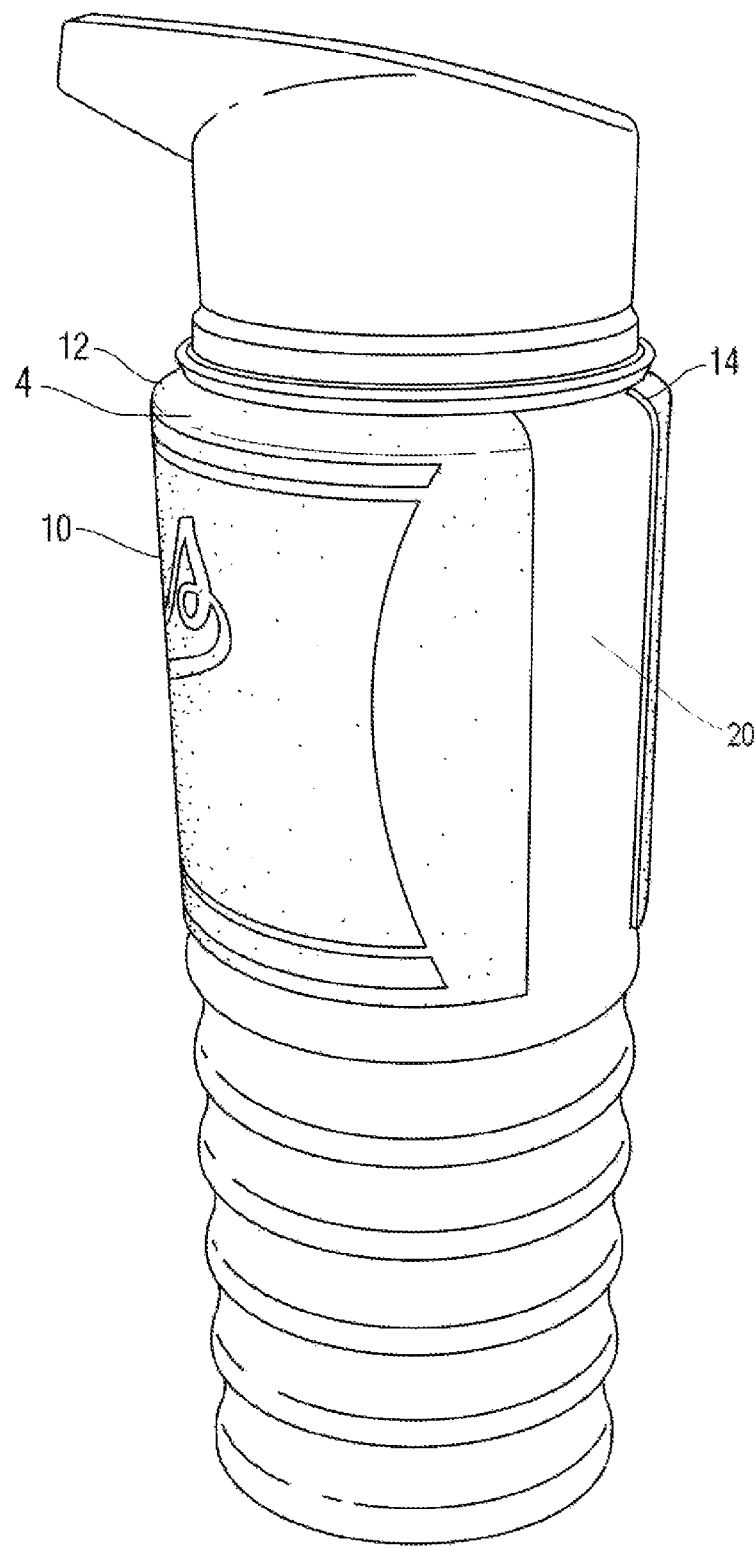
FIG. 3 is a perspective view of the furled plastic bottle sleeve according to the present invention worn on a multi-use water bottle.

FIG. 3 is a perspective view of the furled plastic bottle sleeve according to the present invention worn on a multi-use water bottle. Here the ridge 4 is formed just below the neck of the bottle 10 and the inwardly-curved lip 12 is placed accordingly on the upper edge to enter the rounded ridge 4 of the bottle and releasably anchor the sleeve 10 therein.

Figure 4:
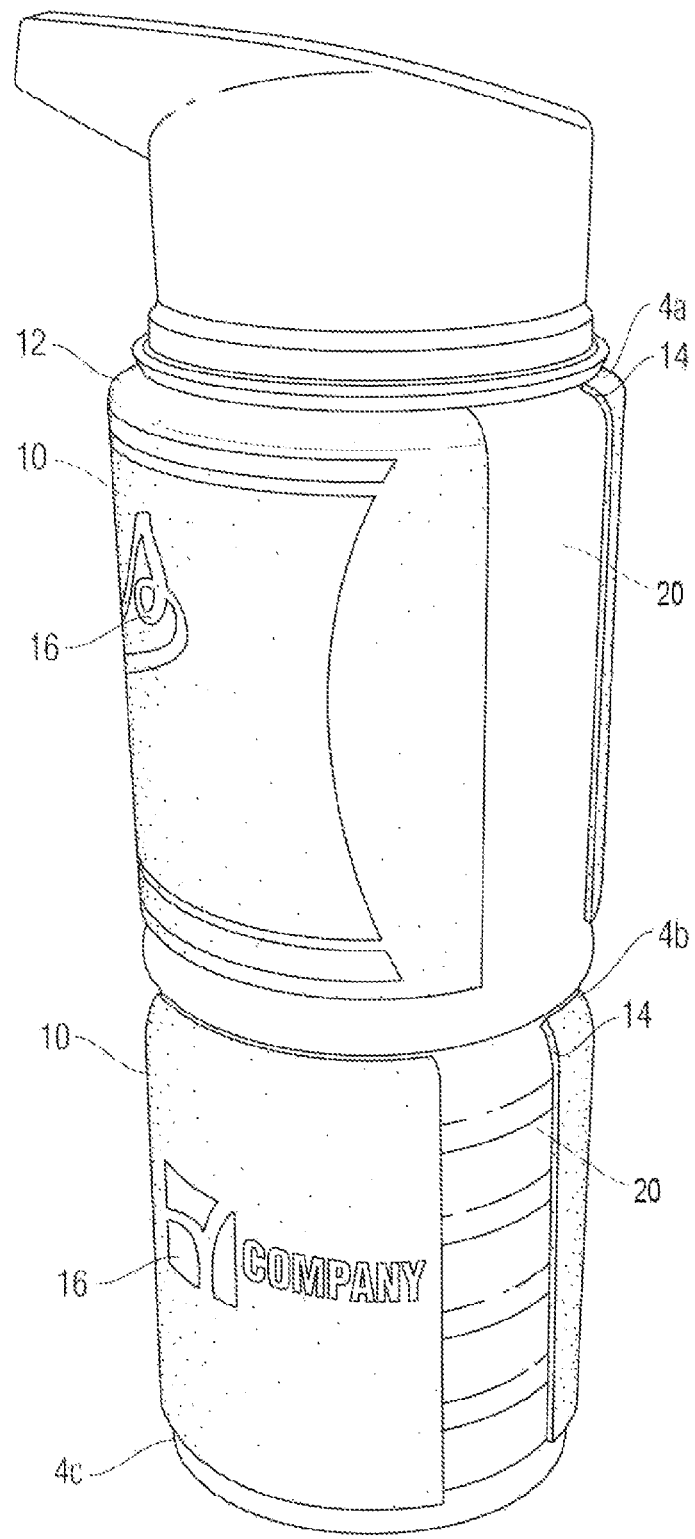
FIG. 4 is a perspective view showing a multi-use water bottle specially-formed to add a dual-sleeve capability.

FIG. 4 is a perspective view showing a multi-use water bottle specially-formed to add a dual-sleeve capability. In this case the multi-use water bottle is specially-formed as described above with three rounded ridges 4a, 4b, 4c, equally spaced along the body of the bottle. The three ridges 4a, 4b, 4c provide two sections on the bottle each capable of seating one sleeve 10 as described above in an end-to-end manner. This dual-sleeve 10 capability provides a dual-labeling effect by which consumers can personalize their water bottle. For example, if the consumer is attending a match between two competing sports teams they can label their bottle with two sleeves 10 reflecting both teams. This adds yet another dimension to the labeling capabilities.

Having now fully set forth the preferred embodiments and certain modifications of the concept underlying the present invention, various other embodiments as well as certain variations and modifications thereto may obviously occur to those skilled in the art upon becoming familiar with the underlying concept. It is to be understood, therefore, that the invention may be practiced otherwise than as specifically set forth herein.

I claim:

1. A container sleeve for wearing on a beverage container comprising at least one annular groove along a body of said beverage container, said container sleeve comprising:

a cylindrical body defined by a resilient sheet of semi-rigid plastic shape-memory material having a plurality of characteristics, said body being open at both ends, slit from end to end, and furled lengthwise along an axis running end to end by one or more of said plurality of characteristics, wherein one of said plurality of characteristics is to normally retain a first diameter that can be forcibly expanded by parting along said slit to a larger second diameter;

at least one of said ends of said cylindrical body being defined by an inwardly-protruding lip conforming to said at least one annular groove for insertion therein;

whereby said sleeve can be inserted downward onto a freestanding beverage container and thereafter clings thereto as a second skin.

2. The container sleeve of claim 1, further comprising a rubber coating applied interiorly of said cylindrical body.

3. The container sleeve of claim 1, further comprising, a rubber coating applied exteriorly of said cylindrical body.

4. The container sleeve of claim 1, wherein the at least one inwardly-protruding lip comprises two inwardly-protruding lips at both ends of said cylindrical body.

5. A container sleeve for wearing on a beverage container formed by a process comprising the steps of:
   blow-molding a hollow plastic cylindrical body using a preform;
   cutting said hollow cylindrical body lengthwise to provide a furled container sleeve formed of shape-memory material having a plurality of characteristics, said container sleeve being open at both ends, slit from end to end, and furled over lengthwise end to end along said slit by one or more of said plurality of characteristics, one of said plurality of characteristics normally retaining said cylindrical body furled over in a first diameter that can be forcibly expanded by parting along said slit to a larger second diameter.

6. The container sleeve of claim 5, further comprising a rubber coating applied interiorly of said cylindrical body.

7. The container sleeve of claim 5, further comprising a rubber coating applied exteriorly of said cylindrical body.

8. The container sleeve of claim 5, wherein the container sleeve comprises at least one inwardly-protruding lip.

9. The container sleeve of claim 8, wherein the at least one inwardly-protruding lip comprises two inwardly-protruding lips at both ends of said container sleeve.

10. In combination with a beverage container formed with a generally cylindrical body defined by three uniformly-spaced recessed annular grooves, at least two container sleeves attached to said beverage container between said grooves, each said container sleeve comprising:
    an elongate hollow cylindrical body preformed from a resilient sheet of semi-rigid plastic shape memory material having a shape-memory characteristic, said body being open at both ends, slit from end to end, and furled over lengthwise end to end along said slit, said shape-memory characteristic normally retaining said cylindrical body furled over in a first diameter that can be forcibly expanded by parting along, said slit to a larger second diameter;
    at least one of said ends of said cylindrical body being defined by an inwardly-protruding lip conforming to at least one of said annular grooves for insertion therein.

* * * * *